United States Patent
Hara et al.

(10) Patent No.: US 8,276,007 B2
(45) Date of Patent: Sep. 25, 2012

(54) PROCESSOR AND SWITCHING POWER SUPPLY APPARATUS

(75) Inventors: Takashi Hara, Kyoto (JP); Koichi Ueki, Takatsuki (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 177 days.

(21) Appl. No.: 12/814,567

(22) Filed: Jun. 14, 2010

(65) Prior Publication Data

US 2010/0241879 A1 Sep. 23, 2010

Related U.S. Application Data (63) Continuation of application No. PCT/JP2008/066816, filed on Sep. 18, 2008.

(30) Foreign Application Priority Data

Dec. 25, 2007 (JP) .................................. 2007-331381

(51) Int. Cl.
- G06F 1/00 (2006.01)
- G06F 13/12 (2006.01)
- G05F 1/40 (2006.01)
- G05F 1/00 (2006.01)
- H03K 17/13 (2006.01)
- H01F 17/00 (2006.01)
- H02M 1/12 (2006.01)

(52) U.S. Cl. ........ 713/300; 323/235; 323/282; 323/319; 323/355; 363/41; 710/69

(58) Field of Classification Search .................. 713/300; 323/235, 282, 319, 355; 363/41; 710/69
See application file for complete search history.

(56) References Cited

U.S. PATENT DOCUMENTS

| | | | |
|---|---|---|---|
| 4,326,265 A | 4/1982 | Boone | |
| 4,857,960 A * | 8/1989 | Hosaka et al. | 399/46 |
| 4,910,375 A * | 3/1990 | Izume | 219/110 |
| 6,195,133 B1 * | 2/2001 | Bae | 348/678 |
| 6,310,953 B1 | 10/2001 | Yoshida et al. | |
| 7,519,439 B2 * | 4/2009 | Watts, Jr. | 700/45 |
| 2004/0000897 A1 | 1/2004 | Asayama | |
| 2006/0022648 A1 * | 2/2006 | Ben-Yaakov et al. | 323/222 |

FOREIGN PATENT DOCUMENTS

JP 05-314256 A 11/1993

(Continued)

OTHER PUBLICATIONS

Official Communication issued in International Patent Application No. PCT/JP2008/066816, mailed on Dec. 9, 2008.

(Continued)

*Primary Examiner* — Stefan Stoynov
(74) *Attorney, Agent, or Firm* — Keating & Bennett, LLP (57) ABSTRACT

A processor includes analog signal input ports, an A/D conversion unit, and an ALU in a stage subsequent to the A/D conversion unit, separately from a CPU. The ALU not only stores a comparison result in a RAM independently of the CPU, but also compares an output value of the A/D conversion unit with a reference value set in the RAM, and interrupts the CPU or issues a command to a PWM generator in accordance with a flag based on the comparison result. This realizes high-speed processing in accordance with a change in an analog signal, although the processor has a low cost and a low clock frequency overall.

6 Claims, 9 Drawing Sheets

FOREIGN PATENT DOCUMENTS

| | | |
|---|---|---|
| JP | 11-041925 A | 2/1999 |
| JP | 11-178326 A | 7/1999 |
| JP | 2000-331791 A | 11/2000 |
| JP | 2001-078443 A | 3/2001 |
| JP | 2002-325434 A | 11/2002 |
| JP | 2003-324954 A | 11/2003 |
| JP | 2004-037635 A | 2/2004 |

OTHER PUBLICATIONS

"TMS320x280x 2801x, 2804x DSP Analog-to-Digital Converter (ADC) Module Reference Guide", Texas Instruments Technical Document, Oct. 2005.

* cited by examiner

PROCESSOR AND SWITCHING POWER SUPPLY APPARATUS

BACKGROUND OF THE INVENTION

1. Field of the Invention

The present invention relates to a processor such as a DSP and a switching power supply apparatus including the processor.

2. Description of the Related Art

In general, a conventional processor such as a microprocessor or a digital signal processor (DSP) includes blocks such as an input/output unit (for example, an A/D converter or a D/A converter), registers, a memory, and an arithmetic and logic unit (ALU), and an analog input signal is processed after being converted to digital data by an A/D converter. The processing speeds of processors basically depend on the clock frequencies thereof for the same bus and the number of operation bits. Basically, the higher the clock frequency of a processor, the higher the processing speed and cost of the processor. For example, a DSP including an A/D converter is disclosed in TEXAS INSTRUMENTS Technical Document "TMS320x280x2801x, 2804x Analog-to-Digital Converter (ADC) Module Reference Guide".

Figure 1:
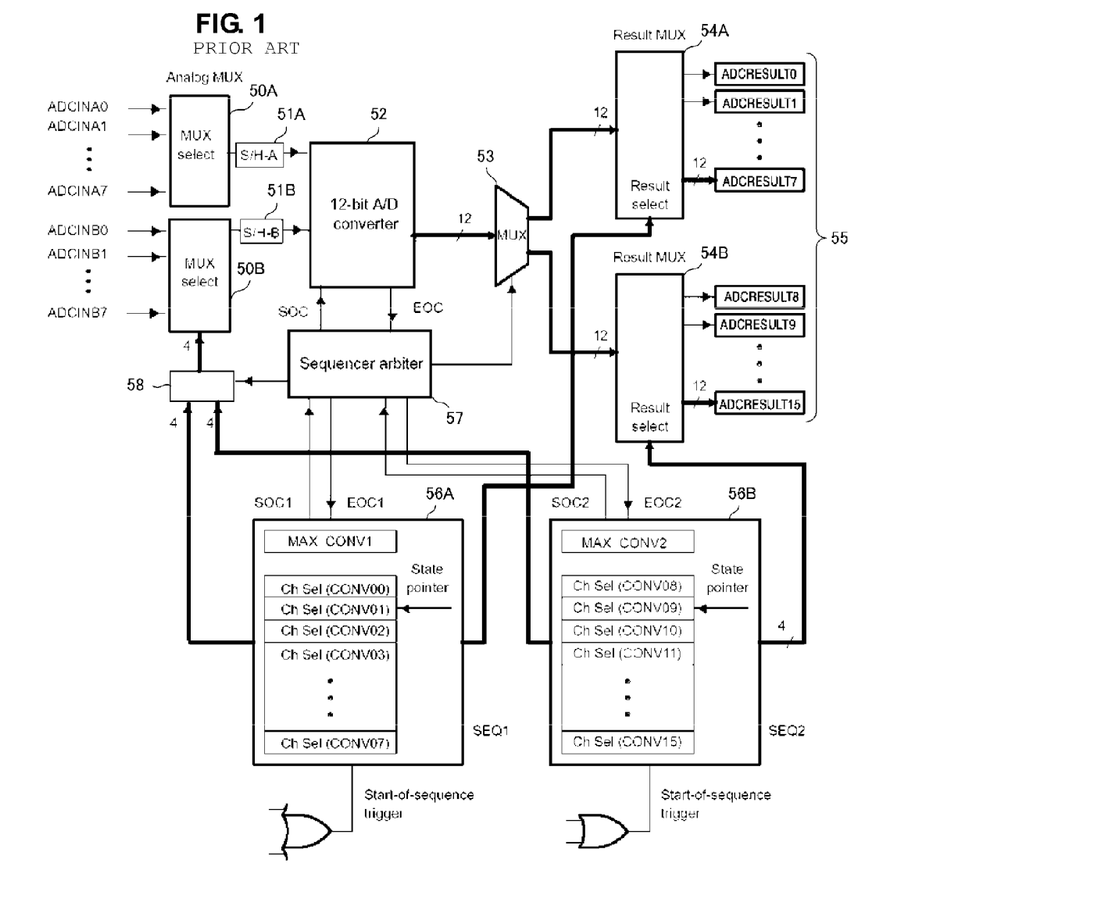
FIG. 1 is a block diagram illustrating the configuration of an A/D converter in a DSP described in the Texas Instruments Technical Document.

FIG. 1 is a block diagram of an A/D converter illustrated in the Texas Instruments Technical Document.

Referring to FIG. 1, analog multiplexers 50A and 50B respectively select analog input ports each having 8 channels (totally 16 channels) in accordance with selection signals provided from sequencers 56A and 56B described later. Sample/hold circuits 51A and 51B sample and hold analog signals selected by the analog multiplexers 50A and 50B. An A/D converter 52 converts a sampled voltage of either the sample/hold circuit 51A or 51B to digital data under the control of a sequencer arbiter 57. A multiplexer 53 outputs the data to either a result multiplexer 54A or 54B selected by the sequencer arbiter 57. The result multiplexers 54A and 54B store the A/D conversion result in a memory 55 in accordance with a select signal provided from the sequencers 56A and 56B. A predetermined one of the sequencers 56A and 56B performs selection from among the analog multiplexers 50A and 50B and from among the result multiplexers 54A and 54B in accordance with an externally provided trigger, and receives an instruction signal and a termination signal of an A/D conversion start signal for the sequencer arbiter 57.

In this manner, a voltage signal of a specified analog input port is A/D converted and stored in the predetermined memory. A CPU within the DSP performs predetermined processing in accordance with the value in the memory 55 (on the basis of the A/D converted result).

Such a DSP described above may be used in the area of switching power supply apparatuses. A typical switching power supply apparatus employs a configuration in which an output voltage is stabilized by monitoring an output voltage, comparing the output voltage with a reference voltage, and performing negative feedback control of switching control in accordance with the comparison result. In this case, on the basis of the value stored in the memory 55 illustrated in FIG. 1, the CPU within the DSP performs control so as to monitor a current flowing through an inductor or the primary winding of a transformer and, when the current value becomes zero, changing the value of an output port to which a circuit for generating a switching control signal is connected, thereby turning on a switching device.

Other than such negative feedback control of an average value as described above, a current mode method is known in which a current flowing through a primary side inductor or the primary coil of a transformer is monitored and a switching device is turned off when the peak value or the one-cycle average value of the current reaches a certain threshold.

The current mode driving method has an advantage of high responsiveness to variation in load or input voltage. Among the current modes, a mode which requires particularly high responsiveness is a driving mode called a "critical mode". In this critical mode, a current flowing through an inductor or the primary coil of a transformer is monitored and upon detection of an instant at which the current becomes zero, a switching device is turned on.

A current-resonance switching power supply apparatus monitors a current flowing through an inductor and detects an instant at which the current becomes zero and thereby turns on a switching device in order to realize zero current switching (ZCS). This control has an advantage in that switching loss is minimized.

However, there has been a problem in that a high-speed and high-cost analog comparator is needed in the case of using analog control for the current-mode or current-resonance switching control. This is because, when there is a time lag in the operation of the comparator, the current mode control, for example, loses its original advantage of high responsiveness, and a current resonance switching power supply loses its original advantage of low switching loss.

Also in the case of using digital control, the following operations are performed: analog data such as an output voltage or an inductor current is first converted to a digital value using an A/D converter, the digital value is stored in a memory and compared with a reference value by a CPU, and the duty ratio of a PWM pulse is computed in accordance with the comparison result. Since the inductor current value may possibly be an abnormal value including noise in single-point detection, a plurality of points are generally sampled during a cycle of switching and the average is computed. This naturally leads to an increased amount of computation. Since the CPU is in charge of performing all other operations in each cycle while keeping timings in synchronization with a clock frequency, a high-frequency, i.e., high-cost processor, is naturally required if the responsiveness at the time of the inductor current becoming zero is to be increased.

SUMMARY OF THE INVENTION

Preferred embodiments of the present invention provide a processor with an improved internal configuration which, although having a low clock frequency and low cost overall, can be used in a power supply apparatus in which high responsiveness is required, for example, for the critical mode control of a current mode converter or the ZCS control of a current resonance power supply. Also, preferred embodiments of the present invention provide a switching power supply apparatus including the above-described processor.

A processor according to a preferred embodiment of the present invention includes: digital signal input/output ports; analog signal input ports; sample/hold circuits arranged to sample and hold voltages of the analog signal input ports; an A/D conversion unit arranged to convert a voltage held by the sample/hold circuit to a digital value; a CPU; and a memory arranged to store a program and data, connected to one another via a bus, a comparison operation unit is provided in a stage subsequent to the A/D conversion unit, the comparison operation unit being arranged to compare an output value of the A/D conversion unit with a reference value stored in advance and to control an output value of a predetermined port of the input/output ports in accordance with a result of the comparison.

By using this configuration, a predetermined signal can be directly generated without control performed by the CPU such that the CPU compares data converted by the A/D conversion unit with a predetermined value and updates a value of an output port in accordance with the result. Accordingly, the processor, although having a low clock frequency overall, can perform control with high responsiveness in accordance with a change in an analog signal, and can be applied to control of apparatuses with low cost and high responsiveness.

A configuration may be used in which a PWM signal generator circuit is provided and arranged to output a PWM signal to the predetermined port of the input/output ports; and the comparison operation unit is arranged to control an operation of the PWM signal generator circuit, thereby controlling an on-duty ratio of PWM.

By using this configuration, the CPU need not perform an operation for the on-duty ratio, or output the PWM signal by updating the output value of the predetermined output port, and the processor can be applied to a circuit that is arranged to perform PWM control in accordance with an analog signal.

A configuration may be used in which the memory contains a program that is operative to control the output value of the predetermined port of the input/output ports through execution of instructions by the CPU, and the comparison operation unit controls the output value of the predetermined port of the input/output ports by interrupting the CPU in accordance with the comparison result.

By using this configuration, different from the case in which the CPU outputs a signal from the predetermined port by performing comparison and determination on the basis of an A/D converted value, the signal can be output with high precision even when using a low clock frequency, since the CPU does not determine the timing at which the signal is output.

In addition, a processor according to another preferred embodiment of the present invention includes: digital signal input/output ports; analog signal input ports; sample/hold circuits arranged to sample and hold voltages of the analog signal input ports; an A/D conversion unit arranged to convert the voltage held by the sample/hold circuit to a digital value; a CPU; and a memory arranged to store a program and data, connected to one another via a bus, a comparison operation unit is provided in a stage subsequent to the A/D conversion unit separately from the CPU, the comparison operation unit being arranged to compare an output value of the A/D conversion unit with a reference value stored in advance and to store a comparison result or a difference value in the memory or a register.

By using this configuration, without the CPU comparing data converted by the A/D conversion unit with a predetermined value and updating the value of the output port in accordance with the result, the CPU need only perform predetermined processing by reading the comparison result already stored in the memory or the register. Accordingly, the processor, although having a low clock frequency over all, can perform control with high responsiveness in accordance with a change in an analog signal, and can be applied to control of apparatuses with low cost and high responsiveness.

A switching power supply apparatus according to a preferred embodiment of the present invention includes: any one of the processors according to the preferred embodiments of the present invention described above; an inductor or a transformer, a switching device arranged to turn on/off a current flowing from an input power supply through the inductor or a primary winding of the transformer; and a rectifying and smoothing circuit arranged to rectify and smooth excited energy of the inductor or the transformer to an output unit, the A/D conversion unit is arranged to convert a detected signal, input to the analog signal input port, of the current which flows through the inductor or the primary winding of the transformer to a digital value; the comparison operation unit is arranged to control an output value (0/1) of the predetermined port at a timing corresponding to a zero-crossing point of the current; and the switching device is switched in accordance with an output signal of the predetermined port.

By using this configuration, a current-mode-control or current-resonance switching power supply apparatus can be realized at low cost.

The memory may contain an overcurrent control program that is operative to terminate switching of the switching device in interrupt processing performed by the CPU interrupted by the comparison operation unit which has detected that the current flowing through the inductor or the primary winding of the transformer is in a state of overcurrent in which the current exceeds a predetermined value.

This configuration realizes high-speed overcurrent protection.

A configuration may be used in which the A/D conversion unit converts a detected signal of a voltage of the input power supply or a voltage of the output unit to a digital value, the detected signal being input to the analog signal input port separately from the current flowing through the inductor or the primary winding of the transformer, and the memory contains an overvoltage protection program that is operative to determine the output value of the predetermined port and to cause the switching of the switching device to be terminated when it is detected by the comparison operation unit that the voltage of the input power supply or the voltage of the output unit is in a state of overvoltage in which the voltage exceeds a predetermined value.

This configuration realizes high-speed overvoltage protection.

In a switching power supply apparatus including one of the processors described above; an inductor or a transformer; a switching device arranged to turn on/off a current flowing from an input power supply through the inductor or a primary winding of the transformer; and a rectifying and smoothing circuit arranged to rectify and smooth excited energy of the inductor or the transformer to an output unit, the A/D conversion unit is configured to convert a detected value, input to the analog signal input port, of a current which flows through the inductor or the primary winding of the transformer to a digital value; and the memory contains an overcurrent protection program that is operative to determine the output value of the predetermined port and to cause the switching of the switching device to be terminated by detecting that the current flowing through the inductor or the primary winding of the transformer is in a state of overcurrent in which the current exceeds a predetermined value on the basis of the comparison result or the difference value stored in the memory or the register by the comparison unit.

This configuration realizes high-speed overcurrent protection.

In a switching power supply apparatus including one of the processors described above; an inductor or a transformer, a switching device arranged to turn on/off a current flowing from an input power supply through the inductor or a primary winding of the transformer; and a rectifying and smoothing circuit arranged to rectify and smooth excited energy of the inductor or the transformer to an output unit, the A/D conversion unit is configured to convert a detected value, input to the analog signal input port, of a voltage of the input power supply or a voltage of the output unit to a digital value; and the memory contains an overvoltage protection program that is operative to determine an output value of the predetermined port and to cause switching of the switching device to be terminated by detecting that the voltage of the input power supply or the voltage of the output unit is in a state of overvoltage in which the voltage exceeds a predetermined value on the basis of a value stored by the comparison unit in the memory or the register.

This configuration realizes high-speed overvoltage protection.

According to various preferred embodiments of the present invention, a processor, although having a low clock frequency overall, can perform control with high responsiveness in accordance with a change in an analog signal, and can be applied to control of apparatuses in which low cost and high responsiveness are required. In addition, low-cost switching power supply apparatuses can be configured which perform real-time switching device control, such as current-mode or current-resonance control instead of average value control.

These and other elements, features, steps, characteristics and advantages of the present invention will become more apparent from the following detailed description of the preferred embodiments with reference to the attached drawings.

BRIEF DESCRIPTION OF THE DRAWINGS

FIGS. 5A-5F is a diagram illustrating the waveforms in various portions of the apparatus.

DETAILED DESCRIPTION OF THE PREFERRED EMBODIMENTS

First Preferred Embodiment

Figure 2:
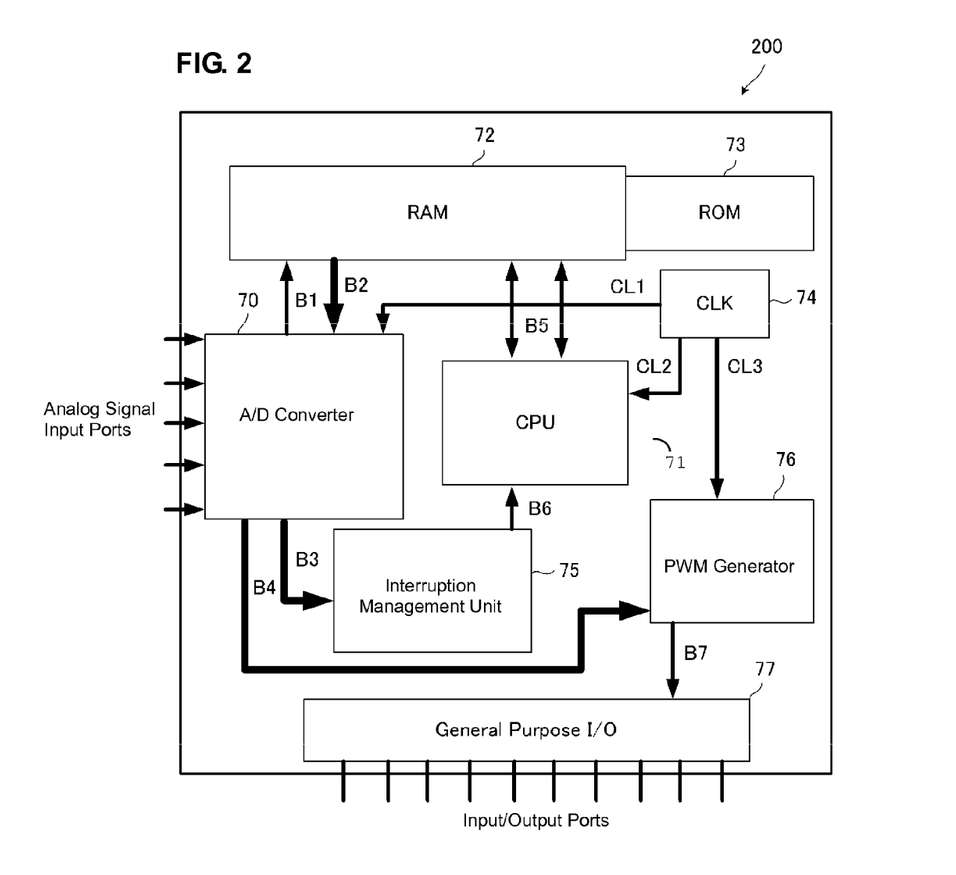
FIG. 2 is a block diagram of the whole configuration of a processor according to a first preferred embodiment of the present invention.
Figure 3:
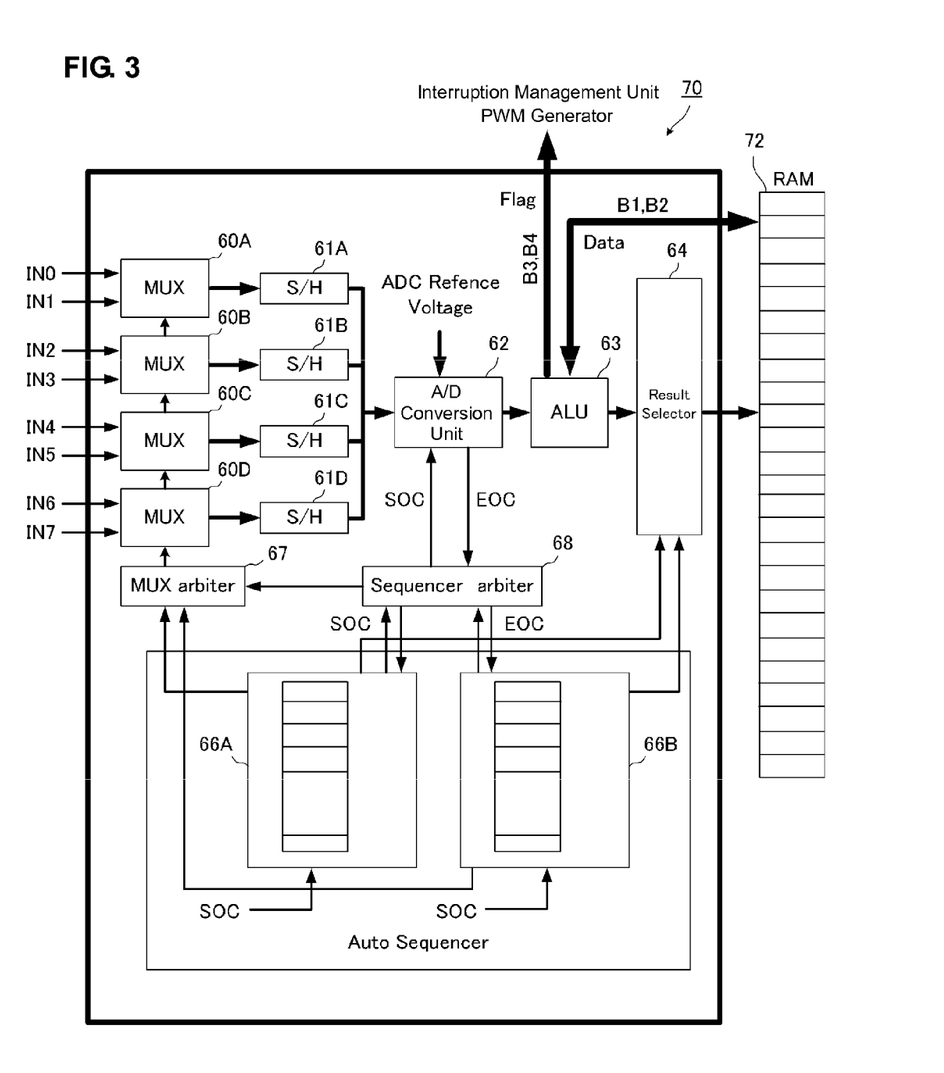
FIG. 3 is a block diagram of the configuration of an A/D converter in the processor.

FIG. 2 is a block diagram of a whole processor according to a first preferred embodiment, and FIG. 3 is a block diagram of an A/D converter, which is a characteristic portion of the processor.

Referring to FIG. 2, the processor 200 preferably includes an A/D converter 70, which converts an analog voltage signal input from an analog signal input port to a digital signal and performs processing as described later, a CPU 71, a RAM 72, a ROM 73, an interruption management unit 75, a PWM generator (PWM signal generator circuit) 76, general purpose input/output ports 77, and a clock signal generator circuit 74.

A BUS B1 arranged to store the operation result of an ALU within the A/D converter 70 in the RAM 72, and a BUS B2 arranged to provide a value (a reference value for conditional determination, for example) stored in the RAM 72 to the ALU at the time of operations performed by the ALU are provided between the A/D converter 70 and the RAM 72/ROM 73.

A bus B3 arranged to transmit an interrupt command signal to the CPU 71 in accordance with the operation result of the ALU within the A/D converter 70 is provided between the A/D converter 70 and the interruption management unit 75. A bus B4 arranged to transmit a command signal to terminate the generation of a PWM signal on the basis of the operation result of the ALU is provided between the A/D converter 70 and the PWM generator 76.

A conventional bus B5 is provided between the CPU 71 and the RAM 72/ROM 73.

A bus B6 arranged to output a command to interrupt the CPU 71 is provided between the interruption management unit 75 and the CPU 71.

A bus B7 arranged to output a signal generated by the PWM generator 76 is provided between the PWM generator 76 and the general purpose input/output ports 77.

The clock signal generator circuit 74 generates a clock signal CL1 for the A/D converter 70, a clock signal CL2 for the CPU 71, and a clock signal CL3 for the PWM generator 76.

FIG. 3 is a diagram illustrating the configuration of the A/D converter 70 within the processor 200 illustrated in FIG. 2. The A/D converter 70 includes eight analog signal input ports IN0 to IN7, and multiplexers 60A to 60D output specified input signals to sample/hold circuits 61A to 61D in accordance with selection signals provided from a multiplexer arbiter 67. An A/D conversion unit 62 converts an analog voltage signal sampled and held in each of the sample/hold circuits 61A to 61D to a digital signal, with a reference voltage signal as a reference, and provides the digital signal to an ALU 63. A result selector 64 selects an address of the RAM 72 specified by sequencers 66A and 66B, and stores the operation result of the ALU 63 at the specified address. The sequencers 66A and 66B control channels for A/D conversion, a sequence, an address arranged to store conversion results, and the like, outputs a start of conversion signal SOC for A/D conversion as a trigger to a sequencer arbiter 68, and receives an end of conversion signal EOC from the A/D conversion unit 62. In addition, the sequencers 66A and 66B sequentially output selection signals to the multiplexer arbiter 67 and the result selector 64.

The ALU 63 includes the following functions.

(1) Performing operations on the conversion result of conversion performed by the A/D conversion unit 62 and a given value, independently of the CPU 71 illustrated in FIG. 2. The given value is transferred from the RAM 72 through the bus B2.

(2) Storing the operation result of the ALU 63 (comparison result or a difference value) in the RAM 72 via the bus B1.

(3) Outputting the value (signal) of a flag generated by an operation to the interruption management unit 75 via the bus B3 and to the PWM generator 76 via the bus B4.

Thereby, the CPU can be interrupted or the generation of the PWM signal is stopped immediately on the basis of the operation result of the ALU 63 independently of the operation processing performed by the CPU 71 illustrated in FIG. 2.

Note that, in the example described above, the ALU 63 preferably stores the comparison result or a difference value in the RAM 72. However, a configuration may be used in which the comparison result or the difference value is stored in a register which can be used in the operation of the CPU 71.

Second Preferred Embodiment

Figure 4:
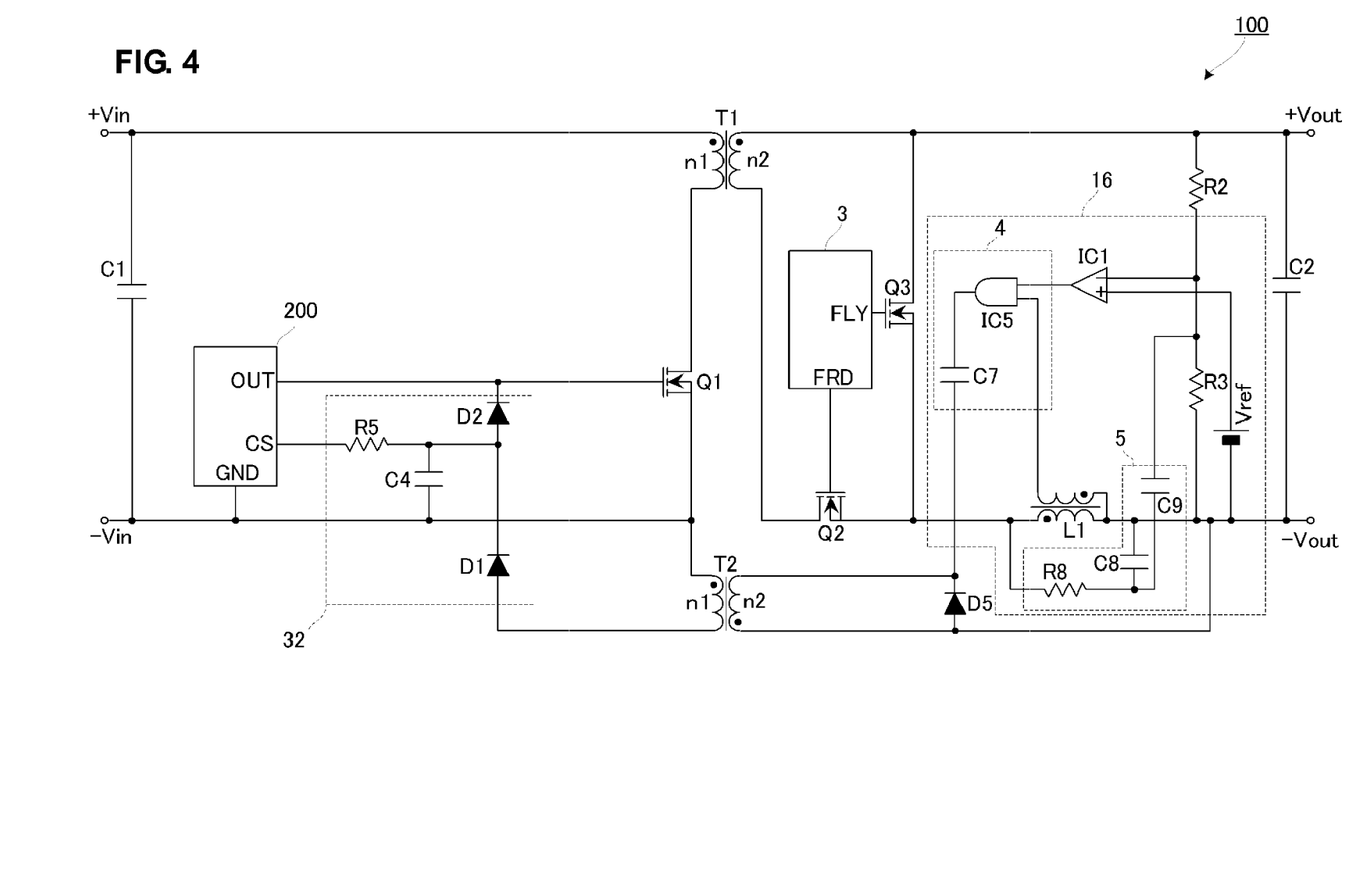
FIG. 4 is a circuit diagram of a switching control apparatus according to a second preferred embodiment of the present invention.

FIG. 4 is a circuit diagram of a switching power supply apparatus according to a second preferred embodiment of the present invention, and FIG. 5 is a diagram illustrating the waveforms in various portions of the apparatus.

Referring to FIG. 4, a terminal +Vin is a (+) input terminal of a dc input power supply, and a terminal −Vin is a (−) input terminal thereof. A terminal +Vout is a (+) output terminal and a terminal −Vout is a (−) output terminal.

This switching power supply apparatus 100 includes an input smoothing capacitor C1, a main transformer T1 including a primary winding n1 and a secondary winding n2, a power switching device Q1 arranged to switch an input voltage applied from the input power supply to the primary winding n1 of the main transformer T1, a processor 200 arranged to generate a switching pulse signal supplied to gate of the power switching device Q1, a rectification side synchronous rectifier Q2 and a commutation side synchronous rectifier Q3 arranged to synchronously rectify a voltage induced in the secondary winding n2 of the main transformer T1, a synchronous rectifier driving circuit 3 arranged to drive the both rectifiers, an off timing signal transmission circuit 4, a ramp wave generator circuit 5, an on-period control circuit 16, a choke coil transformer L1, and an output smoothing capacitor C2.

A pulse transformer T2 and a diode D5 arranged to transmit an output signal of the off timing signal transmission circuit 4 to the primary side in an isolated state are also provided.

The processor 200 tries to output a switching pulse signal (square wave signal) corresponding to the maximum duty ratio, and immediately turns off the power switching device Q1 when a voltage exceeding an overcurrent protection threshold is input to a current sensing terminal CS during the on-period of the power switching device Q1, as will be described later (refer to FIG. 5C).

The above-described current sensing terminal CS is one of the analog signal input ports illustrated in FIG. 2. The OUT terminal is one of the input/output ports illustrated in FIG. 2.

When the voltage level of the OUT terminal of the processor 200 is changed from an L level to an H level at timing t1, the power switching device Q1 is turned on through charging of the input capacitance thereof.

When an off timing signal is transmitted through the pulse transformer T2 at t0 during the on period of the power switching device Q1, the off timing signal is input to the current sensing terminal CS of the processor 200 via a diode D1.

The ALU 63 in the A/D converter 70 is configured to compare the reference value stored in advance in the RAM 72 with the converted value output from the A/D conversion unit 62 and to output a termination command to the PWM generator 76 upon occurrence of the off timing signal.

In this manner, upon detection of an off timing signal voltage, a charge current from the OUT terminal of the processor 200 to the gate of the power switching device Q1 is stopped and the charge in the input capacitance of Q1 is discharged to the OUT terminal side, whereby the power switching device Q1 is turned off (refer to FIGS. 5B, 5C, 5D and 5E).

The synchronous rectifier driving circuit 3 includes a rectification side synchronous rectifier driving terminal FRD, and a commutation side synchronous rectifier driving terminal FLY. The off timing signal transmission circuit 4 is constituted by an AND gate IC5 and a capacitor C7. The on-period control circuit 16 includes a comparator IC1, a reference power source Vref, and voltage divider resistors R2 and R3.

The ramp wave generator circuit 5 generates a voltage signal having a ramp waveform using the choke coil transformer L1 and a CR circuit and inputs the signal to the comparator IC1 of the on-period control circuit 16.

The switching power supply apparatus 100 illustrated in FIG. 4 constitutes a resonance-reset forward converter, and a dc power applied across +Vin and −Vin is, after being smoothed by the input smoothing capacitor C1, subjected to switching through the power switching device Q1 and converted to an ac power. This ac power is transmitted from the primary winding n1 to the secondary winding n2 of the main transformer T1 and, after being rectified by the rectification side synchronous rectifier Q2 and the commutation side synchronous rectifier Q3, is smoothed by the choke coil transformer L1 and the output smoothing capacitor C2, and thereby converted to a dc power again.

The ramp wave generator circuit 5, which is constituted by a resistor R8 and capacitors C8 and C9, receives a voltage across the both ends of the primary winding of the choke coil transformer L1 and generates a ramp wave that is synchronized with the rising edge of a switching pulse signal output by the processor 200.

Figure 5A:
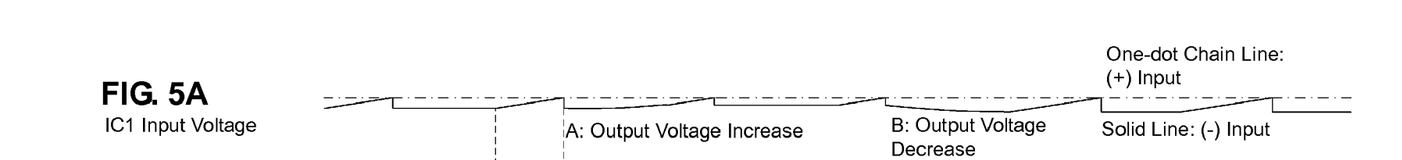
Figure 5B:
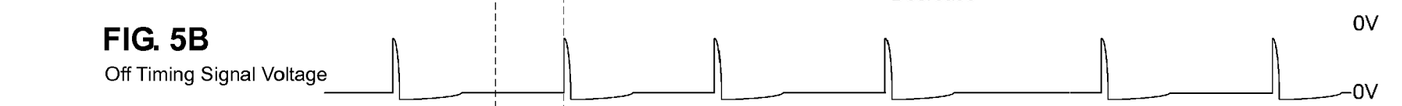
Figure 5C:
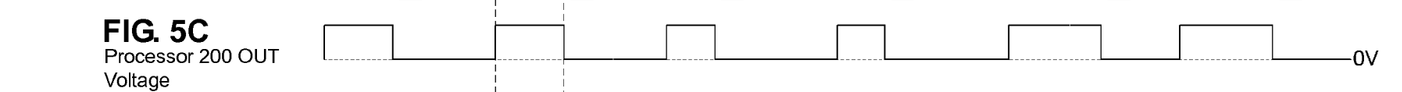
Figure 5D:
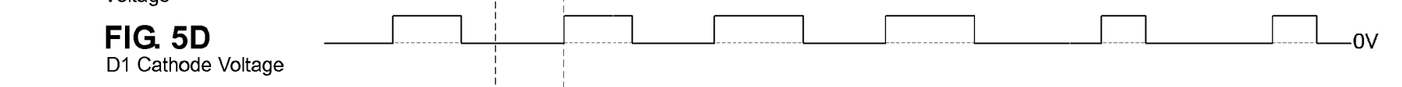
Figure 5E:
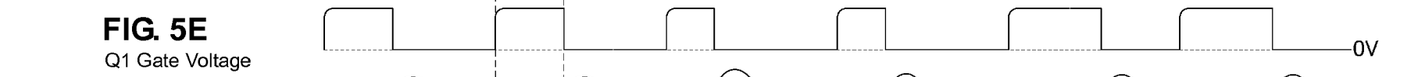
Figure 5F:
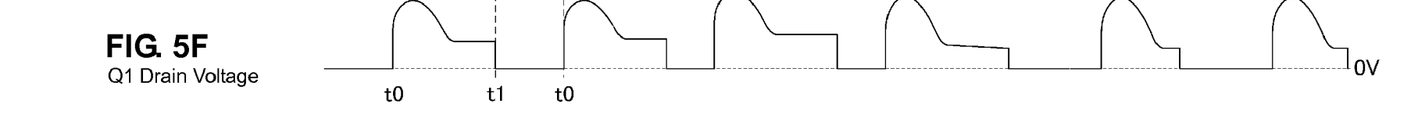

The comparator IC1 of the on-period control circuit 16 compares the output voltage divided by the resistors R2 and R3 and the voltage of the reference power source Vref. The divided voltage of the output voltage input to the (−) terminal of the comparator IC1 has the ramp wave, generated by the ramp wave generator circuit 5, superimposed thereon and gradually increases during the on period of the power switching device Q1. When the (−) input becomes higher than the (+) input due to this gradual increase in the (−) terminal input voltage during the on period, the output voltage level of the comparator IC1 changes from an H level to an L level (refer to FIGS. 5A and 5C).

The AND gate IC5 of the off timing signal transmission circuit 4 receives the voltage of the secondary winding of the choke coil transformer L1 and the output voltage of the comparator IC1 and generates an off timing signal via the capacitor C7 when the output voltage level of the comparator IC1 changes from an H level to an L level during the on period of the power switching device Q1.

This off timing signal is transmitted from the secondary winding n2 to the primary winding n1 of the pulse transformer T2. At this time, the diode D5 resets the pulse transformer T2 which has been excited by the transmission of the off timing signal (refer to FIG. 5B).

As described above, the on timing of the power switching device Q1 is determined in synchronization with the rising timing of the OUT terminal of the processor 200, and the off timing of the power switching device Q1 is determined in synchronization with the off timing signal. Thereby, PWM control is performed and the output voltage of the switching power supply apparatus 100 is stabilized.

Third Preferred Embodiment

In the second preferred embodiment, the function of the PWM generator 76 illustrated in FIG. 2 and the function of the termination command issued from the ALU 63 in the A/D converter 70 to the PWM generator 76 are preferably utilized. However, an example of utilizing the interrupt processing of the CPU 71 is described in a third preferred embodiment.

Figure 6:
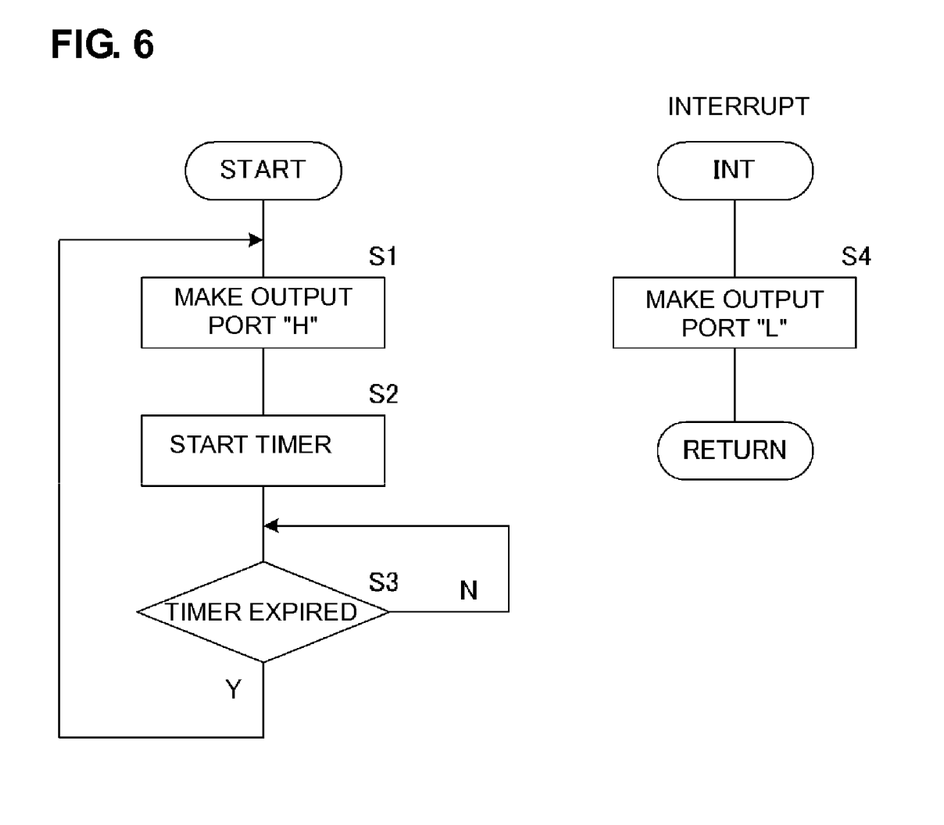
FIG. 6 is a flowchart illustrating the processing steps of a CPU in a processor of a switching control apparatus according to a third preferred embodiment of the present invention.

FIG. 6 is a flowchart illustrating the processing of the CPU 71 in that case. Referring to FIG. 4, the level of an output port corresponding to the OUT terminal of the processor 200 is caused to be an "H" level, and a timer is started (S1→S2). Then, the processing waits until this timer expires (S3). This timer is preferably configured as hardware in the CPU 71.

When an interrupt is received from the interruption management unit 75, the output port level is switched to an "L" level (S4). In this manner, PWM control can also be realized by interrupt processing similarly to the case of the second preferred embodiment.

Fourth Preferred Embodiment

Figure 7:
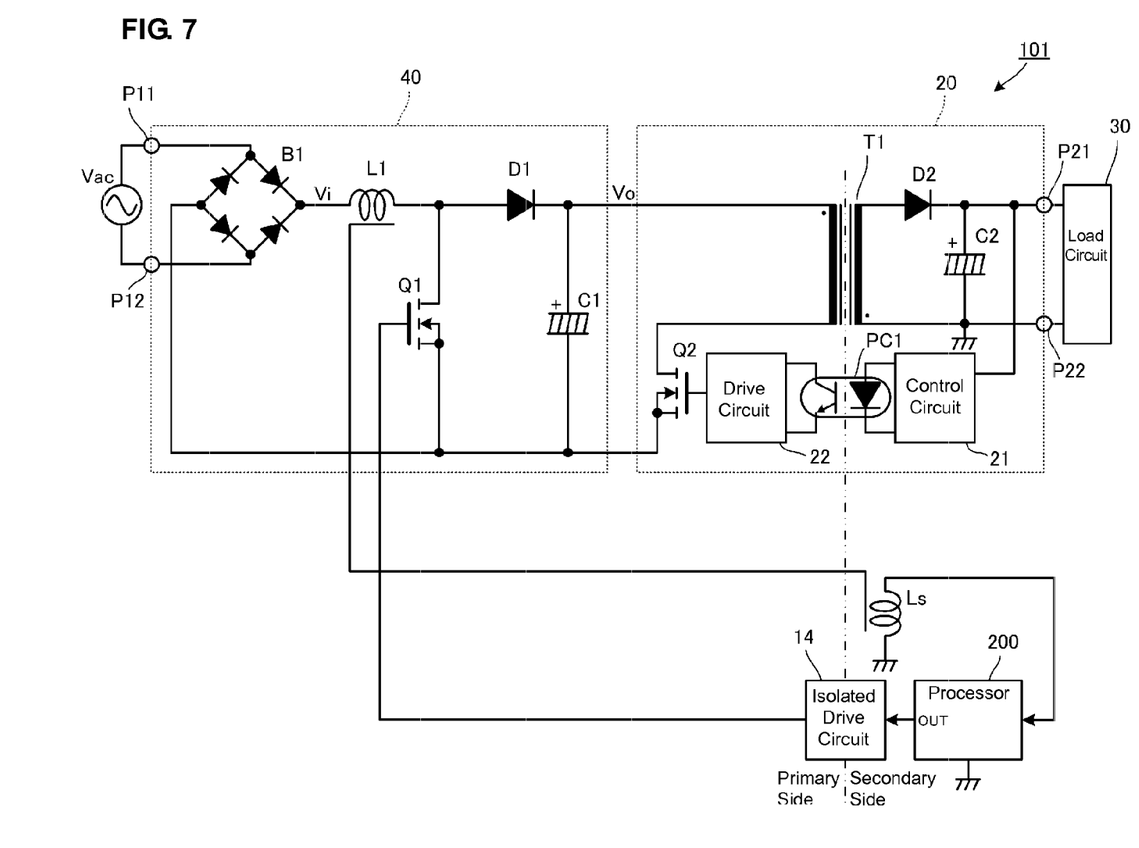
FIG. 7 is a circuit diagram of a switching control apparatus according to a fourth preferred embodiment of the present invention.

FIG. 7 is a circuit diagram of a switching power supply apparatus 101 according to a fourth preferred embodiment.

An inductor L1 of a PFC converter 40 is provided with a bias winding Ls, and the voltage signal of the bias winding Ls of this inductor is input to the analog input port of the processor 200.

An isolated drive circuit 14 is provided between a predetermined port of the input/output ports of the processor 200 and the gate of a switching device Q1 of the PFC converter 40, and a control pulse signal is transmitted in an isolated state. The isolated drive circuit 14 is a circuit using a pulse transformer or a photo coupler, for example.

An ALU 63 within an A/D converter 70 in the processor 200 illustrated in FIG. 7 compares a reference value stored in advance in a RAM 72 with a converted value output from an A/D conversion unit 62, and outputs a termination command to a PWM generator 76 when the inductor current becomes zero.

The PWM generator 76 causes the OUT terminal level to be an "H" level, thereby turning on the switching device Q1. After that, when it is detected by the comparison operation of the ALU 63 that the inductor current has become zero (timing corresponding to zero crossing), the state of the OUT terminal (predetermined input/output port) of the processor 200 is switched (changed to an "L" level) by direct control of the PWM generator 76, whereby the switching device Q1 is turned on. Thereby, switching is performed in a critical mode.

Fifth Preferred Embodiment

Figure 8:
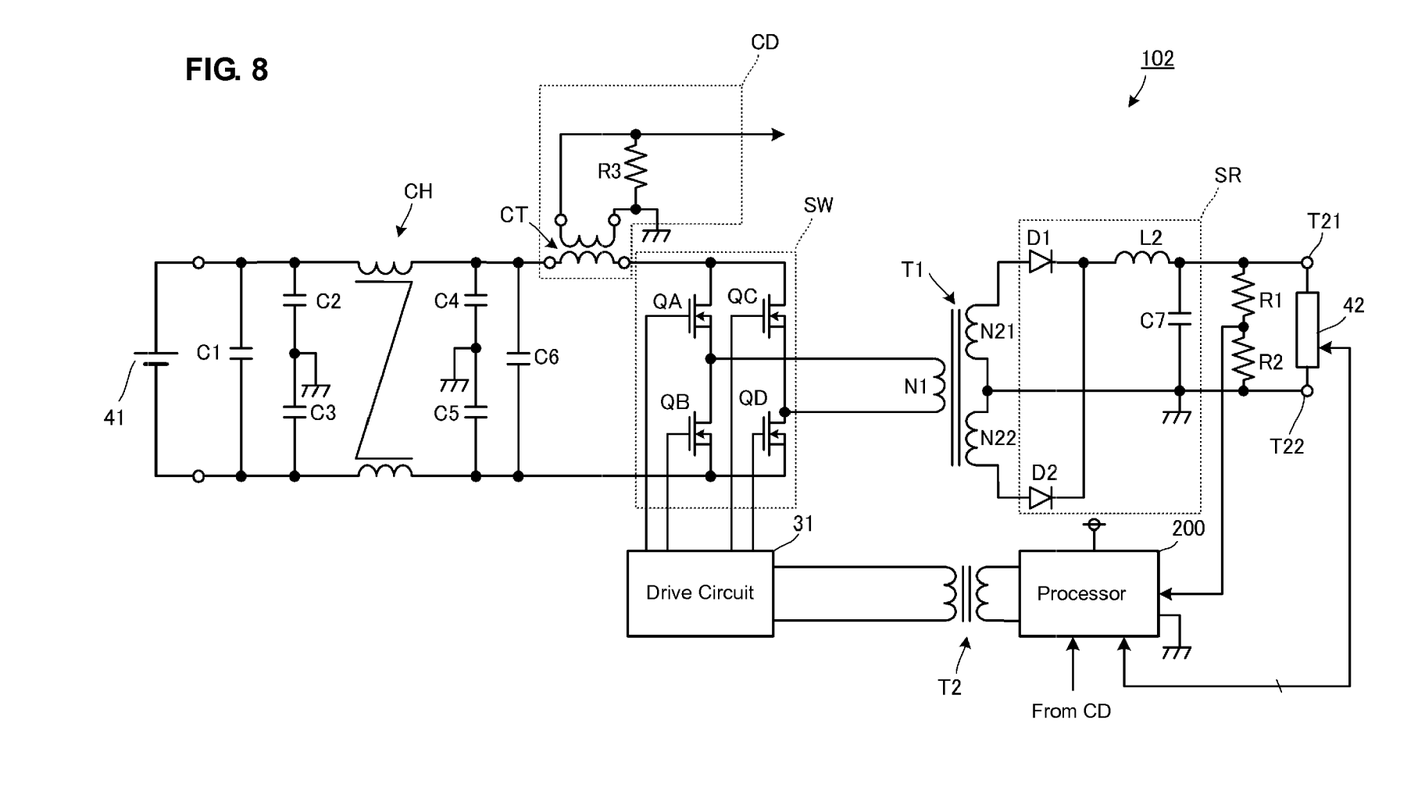
FIG. 8 is a circuit diagram of a switching control apparatus according to a fifth preferred embodiment of the present invention.

FIG. 8 is a circuit diagram of a switching power supply apparatus 102 according to a fifth preferred embodiment.

Referring to FIG. 8, a transformer T1 is provided with a primary winding N1 and secondary windings N21 and N22, and a switching circuit SW constituted by four switching devices QA, QB, QC, and QD having a bridge connection configuration is connected to the primary winding N1. A filter circuit constituted by a common mode choke coil CH and bias capacitors C1 to C6, and a current transformer CT are provided between an input power supply 41 and the switching circuit SW. A current sensor CD is configured by connecting a resistor R3 to the secondary winding of the current transformer CT, whereby a current flowing through the primary side is taken out as a voltage signal.

A drive circuit 31 is connected to the four switching devices QA to QD of the switching circuit SW.

A rectification smoothing circuit SR constituted by rectifier diodes D1 and D2, an inductor L2, and a capacitor C7 is connected to the secondary windings N21 and N22 of the transformer T1. The rectification smoothing circuit SR rectifies and smoothes the excited energy of the transformer T1, thereby outputting an output voltage to output terminals T21 and T22. A load circuit 42 is connected between the output terminals T21 and T22. In addition, an output voltage sensing circuit constituted by resistors R1 and R2 is connected between the output terminals T21 and T22.

The processor 200 illustrated in FIG. 8 is configured such that the ALU 63 within the A/D converter 70 compares the reference value stored in advance in the RAM 72 and the converted value output from the A/D conversion unit 62, and when the output voltage exceeds a predetermined value, a termination command is output to the PWM generator 76.

The configurations and operations of a number of programs executed by the processor 200 are as follows.

Through the operation of the PWM generator 76 illustrated in FIG. 2, a control pulse signal for the switching circuit SW is output to the pulse transformer T2. Thereby, the drive circuit 31 receives the control pulse signal through the pulse transformer T2 and drives the switching devices QA to QD of the switching circuit SW.

The drive circuit 31, on the basis of the rising timing and falling timing of the pulse transformer T2 and through phase control, causes the group of the switching devices QA and QD and the group of the switching devices QB and QC to be turned on/off alternately.

The output voltage is sampled and controlled to have a predetermined peak value through on-duty ratio control of the switching devices QA to QD of the switching circuit SW.

When a peak current flowing through the primary winding N1 exceeds a predetermined upper limit, a termination command is issued to the PWM generator. The peak value is stored in advance in the RAM 72 illustrated in FIG. 3 as an overcurrent protection peak value. The ALU 63 issues the termination command to the PWM generator 76 in response to a flag generated when it is determined on the basis of the comparison operation of the ALU 63 that the digital value of a detected value of a current flowing through the primary winding N1 has exceeded the peak value. Thus, overcurrent protection is realized.

This causes the on-duty ratio be lowered, whereby overcurrent protection is immediately activated.

When the output voltage exceeds a predetermined upper limit, a termination command is issued to the PWM generator. The peak value is also stored in advance in the RAM 72 illustrated in FIG. 3 as an overvoltage protection peak value. The ALU 63 issues the termination command to the PWM generator 76 in response to a flag generated when it is determined on the basis of a comparison operation that the digital value of a detected value of the output voltage has exceeded the peak value. Thereby, overvoltage protection is realized.

This causes the on-duty ratio be lowered, whereby overvoltage protection is immediately activated.

Note that not only the output voltage but also the input voltage may be detected, and when the voltage reaches an overvoltage, the DC-DC converter may be terminated by a termination command issued to the PWM generator 76, whereby overvoltage protection is similarly performed.

Sixth Preferred Embodiment

The preferred embodiments described above are examples which preferably use a PWM generator and the function of the ALU 63 in the A/D converter 70 directly issuing a command signal to the PWM generator 76. However, a sixth preferred embodiment is an example in which PWM control, overcurrent protection, and overvoltage protection are performed on the basis of values stored in the RAM 72 illustrated in FIG. 3 without utilizing the function of issuing a command signal to the PWM generator and without interrupting a CPU.

Figure 9:
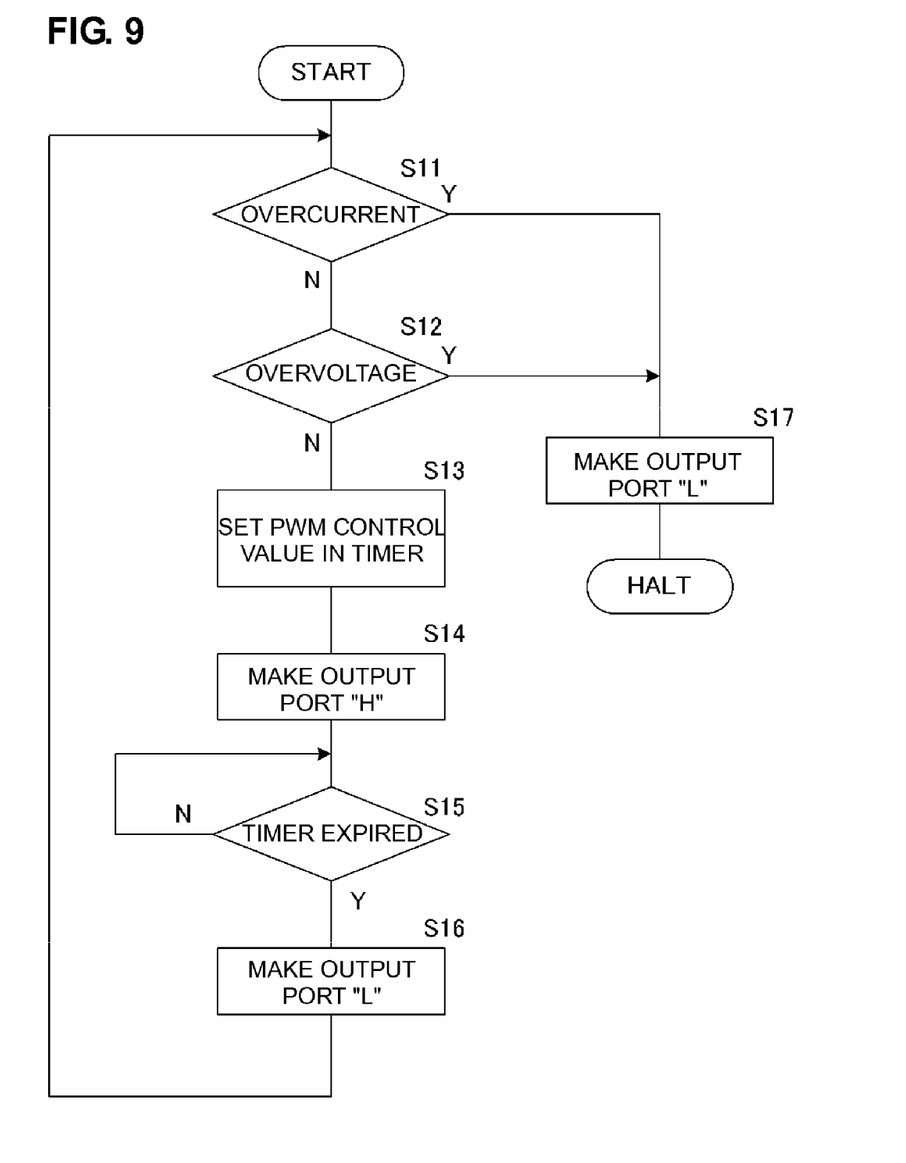
FIG. 9 is a flowchart illustrating the processing steps of a CPU in a processor used for a switching control apparatus according to a sixth preferred embodiment of the present invention.

FIG. 9 is a flowchart illustrating the processing steps of the CPU in this case. The comparison results obtained by the ALU 63 (in this example, state data as to whether or not an over-current state has been entered and state data as to whether or not an overvoltage state has been entered) are stored in the RAM 72 illustrated in FIG. 3 at a predetermined address. The CPU 71, by referring to the state data, terminates the switching control by making the level of a predetermined port of the output ports an "L" level, in the case of an over-current state or an overvoltage state (S11→S12→S17).

The ALU 63, in a predetermined sequence, computes a PWM control value in accordance with the operation of comparison between the output voltage value and a reference value (target value), and stores the computed value in the RAM 72 at a predetermined address. The CPU 71 reads the PWM control value from the RAM 72, sets the value in a timer, and causes the output port level to be an "H" level (S13→S14). The CPU 71 waits for the timer to expire, and when the timer expires, causes the output port level to be an "L" level (S15→S16). By repeating the above processing, constant-voltage control is performed, and overcurrent protection and overvoltage protection are realized.

In this example, the ALU 63 preferably stores the comparison result in the RAM 72. However, a configuration may be used in which the ALU 63 stores a difference value in the RAM 72, and the CPU 71 performs predetermined processing in accordance with the difference value (for example, depending on whether or not the difference value exceeds a predetermined value).

Even when the comparison result or the difference value is thus referred to without utilizing a flag determined by the operation of the ALU 63, high-speed processing is realized overall since the comparison operation is performed independently of the processing of the CPU 71.

Note that, by using the processor, various preferred embodiments of the present invention can be applied to switching power supply apparatuses performing various types of control in accordance with a change in an analog signal, such as ZCS control of a current resonance power supply, other than the control described above.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A processor comprising:
    digital signal input/output ports;
    analog signal input ports;
    sample/hold circuits arranged to sample and hold voltages of the analog signal input ports;
    an A/D conversion unit arranged to convert a voltage held by the sample/hold circuits to a digital value;
    a CPU; and
    a memory arranged to store a program and data, and connected to the CPU via a bus; wherein
    a comparison operation unit is provided in a stage subsequent to the A/D conversion unit, the comparison operation unit being arranged to compare an output value of the A/D conversion unit with a reference value stored in advance in the comparison operation unit and to control an output value of a predetermined port of the input/output ports in accordance with a result of the comparison.

2. The processor according to claim 1, wherein a PWM signal generator circuit is arranged to output a PWM signal to the predetermined port of the input/output ports, and the comparison operation unit is arranged to control an operation of the PWM signal generator circuit, to thereby control an on-duty ratio of PWM.

3. The processor according to claim 1, wherein the memory contains a program that is operative to control the output value of the predetermined port of the input/output ports through execution of instructions by the CPU, and the comparison operation unit arranged to control the output value of the predetermined port of the input/output ports by interrupting the CPU in accordance with the comparison result.

4. A switching power supply apparatus comprising:
    the processor according to claim 1;
    an inductor or a transformer;
    a switching device arranged to turn on/off a current flowing from an input power supply through the inductor or a primary winding of the transformer; and
    a rectifying and smoothing circuit arranged to rectify and smooth excited energy of the inductor or the transformer to an output unit; wherein
    the A/D conversion unit is arranged to convert a detected signal, input to the analog signal input ports, of the current which flows through the inductor or the primary winding of the transformer to a digital value;
    the comparison operation unit is arranged to control an output value of the predetermined port at a timing corresponding to a zero-crossing point of the current; and
    the switching device is switched in accordance with an output signal of the predetermined port.

5. The switching power supply apparatus according to claim 4, wherein the memory contains an overcurrent control program that is operative when executed by the CPU to terminate switching of the switching device in interrupt processing performed by the CPU interrupted by the comparison operation unit which has detected that the current flowing through the inductor or the primary winding of the transformer is in a state of overcurrent in which the current exceeds a predetermined value.

6. The switching power supply apparatus according to claim 4, wherein the A/D conversion unit is arranged to convert a detected signal of a voltage of the input power supply or a voltage of the output unit to a digital value, the detected signal being input to the analog signal input port separately from the current flowing through the inductor or the primary winding of the transformer, and the memory contains an overvoltage protection program that is operative when executed by the CPU to determine the output value of the predetermined port and to cause the switching of the switching device to be terminated when it is detected by the comparison operation unit that the voltage of the input power supply or the voltage of the output unit is in a state of overvoltage in which the voltage exceeds a predetermined value.

* * * * *